United States Patent
Schweiger et al.

(10) Patent No.: US 10,836,258 B2
(45) Date of Patent: Nov. 17, 2020

(54) PRECONDITIONING OF AN ENERGY STORE OF A MOTOR VEHICLE

(71) Applicant: Bayerische Motoren Werke Aktiengesellschaft, Munich (DE)

(72) Inventors: Benno Schweiger, Munich (DE); Bernhard Kreppold, Fuerstenfeldbruck (DE); Andreas Maerkl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 136 days.

(21) Appl. No.: 16/106,672

(22) Filed: Aug. 21, 2018

(65) Prior Publication Data
US 2019/0061536 A1 Feb. 28, 2019

(30) Foreign Application Priority Data

Aug. 22, 2017 (DE) .......................... 10 2017 214 643

(51) Int. Cl.
*B60L 1/02* (2006.01)
*B60L 53/00* (2019.01)
*B60L 1/00* (2006.01)
*B60L 58/25* (2019.01)
*B60L 53/10* (2019.01)

(52) U.S. Cl.
CPC ................. *B60L 1/02* (2013.01); *B60L 1/003* (2013.01); *B60L 53/00* (2019.02); *B60L 53/10* (2019.02); *B60L 58/25* (2019.02); *B60L 2240/36* (2013.01); *B60L 2240/545* (2013.01); *B60L 2240/80* (2013.01)

(58) Field of Classification Search
CPC .. B60L 1/02; B60L 1/003; B60L 58/25; B60L 53/10; B60L 53/00; B60L 2240/36; B60L 2240/80; B60L 2240/545; B60L 11/1809; B60L 11/1851; B60L 11/1872; B60L 11/187

See application file for complete search history.

(56) References Cited

U.S. PATENT DOCUMENTS

| | | | |
|---|---|---|---|
| 2012/0261397 A1* | 10/2012 | Schwarz | H01M 10/633 219/202 |
| 2016/0152151 A1* | 6/2016 | Yang | B60L 53/00 320/109 |
| 2017/0113560 A1* | 4/2017 | Oguma | H02J 7/1423 |
| 2017/0326990 A1* | 11/2017 | Tokito | H01M 10/44 |
| 2018/0093583 A1* | 4/2018 | Kim | B60L 58/18 |

* cited by examiner

*Primary Examiner* — Jess Whittington
*Assistant Examiner* — Brian E Yang
(74) *Attorney, Agent, or Firm* — Crowell & Moring LLP

(57) ABSTRACT

A control device controls a preconditioning of at least one energy consumer in a motor vehicle and an energy store incorporated in the motor vehicle. The control device is designed to control the energy take-up of the energy consumer and the energy take-up of a charging device incorporated in the motor vehicle such that a difference is generated between the energy take-up of the energy consumer and the energy take-up of the charging device, which is compensated by an energy take-up of the energy store or by a release of energy from the energy store, with the result that the energy store is warmed by the power loss associated with the energy take-up or with the release of energy from the energy store.

9 Claims, 3 Drawing Sheets

PRIOR ART

PRECONDITIONING OF AN ENERGY STORE OF A MOTOR VEHICLE

CROSS REFERENCE TO RELATED APPLICATION

This application claims priority under 35 U.S.C. § 119 from German Patent Application No. 10 2017 214 643.5, filed Aug. 22, 2017, the entire disclosure of which is herein expressly incorporated by reference.

BACKGROUND AND SUMMARY OF THE INVENTION

The invention relates to a device and a method for the preconditioning of an energy store of a motor vehicle.

It is known that the electric power delivered by an energy store is dependent upon temperature. In particular at low temperatures, the electric power delivered by the energy store can be very low, even though a state of charge of the energy store can be very high. This poses a problem, in particular in electric vehicles. If, for example, the electric vehicle has been stationary for a long period under exposure to cold external temperatures, only limited electric power of the energy store will be available upon use of the electric vehicle following this period of immobilization.

The object of the invention is the disclosure of a control device and a corresponding method which at least alleviate the described issue.

This object is achieved by a control device and method for controlling a preconditioning of at least one energy consumer in a motor vehicle and of an energy store incorporated in the motor vehicle, comprising: a control device operatively configured to: control the energy take-up of the energy consumer and the energy take-up of a charging device incorporated in the motor vehicle so that a difference is generated between the energy take-up of the energy consumer and the energy take-up of the charging device, compensate the difference generated by an energy take-up of the energy store or by a release of energy from the energy store, whereby the energy store is warmed by power loss associated with the take-up of energy or with the release of energy from the energy store.

A first aspect of the invention relates to a control device for the control of a preconditioning of at least one energy consumer in a motor vehicle, and of an energy store incorporated in the motor vehicle.

Preconditioning can in particular be warming or heating-up prior to an intended use of the motor vehicle.

The control device is moreover designed to control the energy take-up of the energy consumer and the energy take-up of a charging device which is incorporated in the motor vehicle such that a difference is generated between the energy take-up of the energy consumer and the energy take-up of the charging device.

Alternatively, the charging device can also be embodied externally to the vehicle, wherein, for example, the control device is then connected to the charging device by means of a cabled control line or a wireless control line.

A difference between the energy take-up of the energy consumer and the energy take-up of the charging device in particular occurs in the event that the energy take-up of the energy consumer exceeds the energy take-up of the charging device.

Alternatively thereto, a difference between the energy take-up of the energy consumer and the energy take-up of the charging device in particular occurs in the event that the energy take-up of the energy consumer undershoots the energy take-up of the charging device.

In particular, the energy take-up of the energy consumer and/or the energy take-up of the charging device can be zero, with the result that the magnitude of the difference between the energy take-up of the energy consumer and the energy take-up of the charging device corresponds to the magnitude of the respective other value.

The difference between the energy take-up of the energy consumer and the energy take-up of the charging device is compensated by an energy take-up of the energy store, or by a release of energy from the energy store, with the result that the energy store is warmed by the power loss associated with the energy take-up or the release of energy from the energy store.

If the energy take-up of the energy consumer exceeds the energy take-up of the charging device, energy can in particular be released by the energy store.

If the energy take-up of the energy consumer undershoots the energy take-up of the charging device, energy can in particular be taken up by the energy store.

The invention is further based upon the knowledge that although a heating-up of the energy store by the controlled generation of power loss can increase the efficiency of the energy store, an energy store which, insofar as possible, is fully-charged is more useful to the operation of the motor vehicle than a comparatively empty energy store.

Consequently, it is in particular advantageous if the control device is designed such that, in the control of the energy take-up of the energy consumer and the energy take-up of the charging device, a selected target state of charge of the energy store is considered. This can proceed, for example, such that the difference between the energy take-up of the energy consumer and the energy take-up of the charging device is controlled such that a positive and a negative difference is generated in an alternating manner. As the state of charge of the energy store essentially corresponds to the integral of the energy take-up and the energy output of the energy store, which in turn compensate the difference between the energy take-up of the energy consumer and the energy take-up of the charging device, a target state of charge can deliberately be achieved accordingly.

In an advantageous form of embodiment, the control device is designed such that the difference between the energy take-up of the energy consumer and the energy take-up of the charging device is entirely compensated by an energy take-up of the energy store or by a release of energy from the energy store.

In a further advantageous form of embodiment, the control device is designed to control the energy take-up of the energy consumer such that, in the event of essentially constant energy take-up of the charging device, the energy take-up of the energy consumer exceeds and undershoots the energy take-up of the charging device in an alternating manner.

The invention here is based upon the knowledge that, as a result of marginal technical conditions of the charging device, the latter can possibly only take up energy at a constant rate.

As a result of the alternating overshoot and undershoot of the energy take-up of the charging device by the energy take-up of the energy consumer, it is possible that the energy consumer may not fulfill its function with a consistent quality. This can result, for example, in impairments to the comfort of a driver of the motor vehicle when the driver is present in the motor vehicle. However, if the driver is not present in the motor vehicle, the occurrence of any potential impairments of comfort is of no relevance. For example, the operation of an auxiliary heating system constitutes one exemplary embodiment in which a consistent quality of operation of an energy consumer is of little relevance.

In a further advantageous form of embodiment, the control device is designed to control the energy take-up of the charging device such that, in the event of essentially constant energy take-up of the energy consumer, the energy take-up of the charging device exceeds and undershoots the energy take-up of the energy consumer in an alternating manner.

The invention here is based upon the knowledge that a heating-up of the energy store by the power loss generated in the case of the energy take-up and release of energy is not reciprocally excluded by a constant operation of the energy consumer.

In a further advantageous form of embodiment, the control device is designed to control the energy take-up of the charging device and the energy take-up of the energy consumer such that in the event of increasing energy take-up of the charging device, the energy take-up of the energy consumer reduces, and/or in the event of reducing energy take-up of the charging device, the energy take-up of the energy consumer increases.

The invention here is based upon the knowledge that, since the characteristics of the energy take-up of the charging device and the energy take-up of the energy consumer are in mutual opposition, the energy difference to be compensated by the energy store is maximized. This permits a generation of the maximum possible power loss, and thus of the heat for the heat-up of the energy store.

In a further advantageous form of embodiment, the energy consumer is a heating device in a motor vehicle. In particular, this is an internal heater (e.g. an auxiliary heater or air conditioning system) or an external heater (e.g. a windscreen heater). Alternatively, the energy consumer can also be an air conditioning system or a cooling device.

In a further advantageous form of embodiment, the control device is designed to control the energy take-up of the energy consumer and the energy take-up of the charging device when the motor vehicle is connected to a charging device which is external to the motor vehicle.

The invention here is based upon the knowledge that the above discussed marginal condition for the consideration of the state of charge of the energy store is in particular achievable when electrical energy is supplied to the motor vehicle from an external source.

In a further advantageous form of embodiment, the control device is designed to determine a duration of an energy store heat-up phase according to a current temperature of the energy store and a service temperature of the energy store.

The control device controls the energy take-up of the energy consumer and the energy take-up of the charging device according to a planned departure time and the duration of the energy store heat-up phase such that, at the planned departure time, the energy store achieves the service temperature.

The planned departure time here can in particular be predetermined by the driver of the motor vehicle, for example by means of an input unit of the motor vehicle or by means of a smart device which is connected to the motor vehicle (e.g. a mobile telephone or smartphone).

The service temperature can in particular be selected according to the properties of the energy storage cells of the energy store such that the electric power which is available for delivery by the energy store corresponds to a predefined percentage threshold value of the maximum deliverable electric power from the energy store. For example, this figure can be 80%.

A second aspect of the invention relates to a method for controlling a preconditioning of at least one energy consumer of a motor vehicle and of an energy store which is incorporated in the motor vehicle.

To this end, the energy take-up of the energy consumer and the energy take-up of a charging device incorporated in the motor vehicle are controlled such that a difference is generated between the energy take-up of the energy consumer and the energy take-up of the charging device which is compensated by an energy take-up of the energy store or by an energy release from the energy store, with the result that the energy store is warmed by the power loss associated with the energy take-up or the release of energy from the energy store.

The preceding descriptions of the control device according to the invention with respect to the first aspect of the invention also apply correspondingly to the method according to the invention with respect to the second aspect of the invention. At this point, and in the patent claims, advantageous exemplary embodiments of the method according to the invention which are not explicitly described correspond to the above-described advantageous exemplary embodiments of the control device according to the invention, or to those described in the patent claims.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
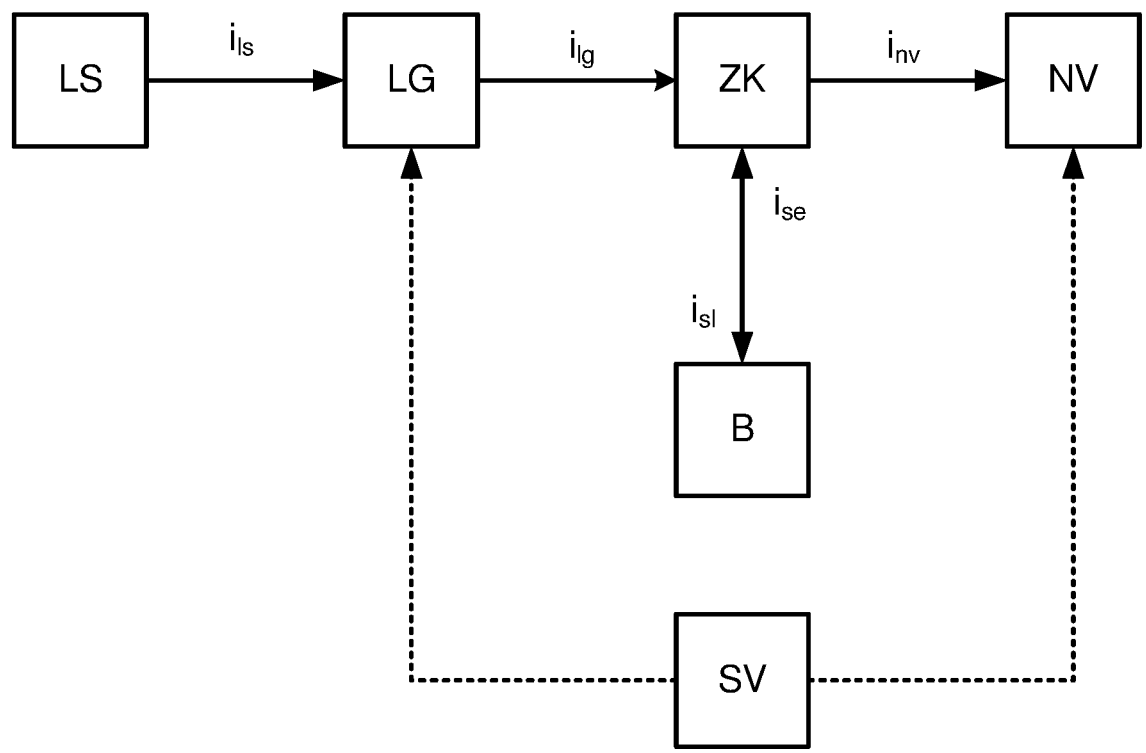
FIG. 1 shows an exemplary embodiment of the control device according to the invention.

FIG. 1 shows a control device SV for the control of a preconditioning of at least one energy consumer NV, for example of an auxiliary heater, of a motor vehicle and of an energy store B incorporated in the motor vehicle.

The control device SV is designed to control the energy take-up $i_{nv}$ of the energy consumer NV and the energy take-up $i_{ls}$ of a charging device LG incorporated in the motor vehicle such that a difference is generated between the energy take-up $i_{nv}$ of the energy consumer NV and the energy take-up $i_{ls}$ of the charging device LG.

For the energy take-up $i_{ls}$, the charging device LG can in particular be connected to a charging system LS which is external to the vehicle, for example to a charging station.

The charging device LG is, for example, connected internally to the vehicle via an intermediate circuit ZK to the energy consumer NV and to the energy store B, wherein the charging device LG delivers the energy $i_{lg}$ to the intermediate circuit ZK.

The difference between the energy take-up $i_{nv}$ of the energy consumer NV and the energy take-up $i_{ls}$ of the charging device LG is compensated by an energy take-up $i_{sl}$ of the energy store B or by a release of energy $i_{se}$ from the energy store B, with the result that the energy store B is warmed by the power loss associated with the energy take-up $i_{ls}$ or with the release of energy $i_{se}$ from the energy store B.

Figure 2:
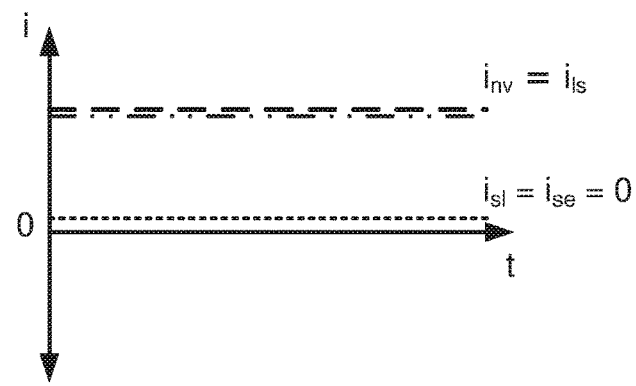
FIG. 2 shows an exemplary embodiment of energy characteristics in the prior art.

FIG. 2 shows an exemplary embodiment of an energy characteristic according to the prior art. Herein, the energy take-up $i_{nv}$ of the energy consumer NV is entirely compensated by the energy take-up $i_s$ of the charging device LG, with the result that the energy store B is not required to either release or take up energy. Consequently, there is no heating-up of the energy store B associated with power loss.

Figure 3:
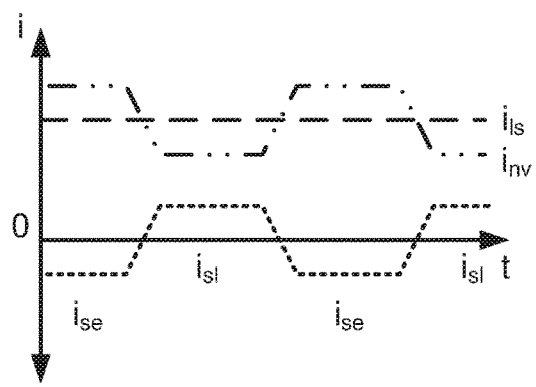
FIGS. 3-6 show exemplary embodiments of energy characteristics according to the invention.

FIG. 3 shows an exemplary embodiment of an energy characteristic according to the invention. The control device SV here is designed to control the energy take-up $i_{nv}$ of the energy consumer NV such that the energy take-up $i_{nv}$ of the energy consumer NV, in the event of essentially constant energy take-up $i_{ls}$ of the charging device LG, exceeds and undershoots the energy take-up $i_{ls}$ of the charging device LG in an alternating manner.

The resulting difference between the energy take-up $i_{nv}$ of the energy consumer NV and the energy take-up $i_{ls}$ of the charging device LG is compensated by the energy store B.

If the energy take-up $i_{nv}$ of the energy consumer NV exceeds the energy take-up $i_{ls}$ of the charging device LG, an additional release of energy $i_{se}$ from the energy store B occurs. If the energy take-up $i_{nv}$ of the energy consumer NV undershoots the energy take-up $i_{ls}$ of the charging device LG, an energy take-up $i_{sl}$ of the energy store B occurs.

Figure 4:
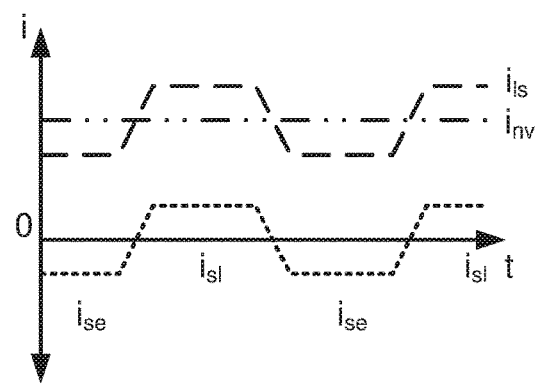

FIG. 4 shows an exemplary embodiment of an energy characteristic according to the invention. The control device SV here is designed to control the energy take-up $i_{ls}$ of the charging device LG such that the energy take-up $i_{ls}$ of the charging device LG, in the event of essentially constant energy take-up $i_{nv}$ of the energy consumer NV, exceeds and undershoots the energy take-up $i_{nv}$ of the energy consumer NV in an alternating manner.

The resulting difference between the energy take-up $i_{nv}$ of the energy consumer NV and the energy take-up $i_{ls}$ of the charging device LG is compensated by the energy store B.

If the energy take-up $i_{nv}$ of the energy consumer NV exceeds the energy take-up $i_{ls}$ of the charging device LG, an additional release of energy $i_{se}$ from the energy store B occurs. If the energy take-up $i_{nv}$ of the energy consumer NV undershoots the energy take-up $i_{ls}$ of the charging device LG, an energy take-up $i_{sl}$ of the energy store B occurs.

Figure 5:
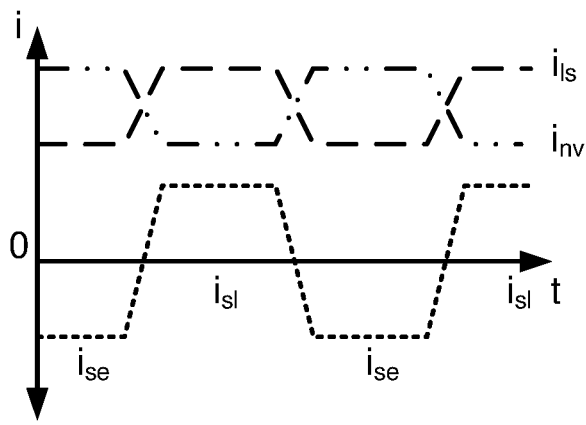

FIG. 5 shows an exemplary embodiment of an energy characteristic according to the invention. The control device SV here is designed to control the energy take-up $i_{ls}$ of the charging device LG and the energy take-up $i_{nv}$ of the energy consumer NV such that in the event of increasing energy take-up $i_{ls}$ of the charging device LG, the energy take-up $i_{nv}$ of the energy consumer NV reduces, and/or in the event of reducing energy take-up $i_{ls}$ of the charging device LG, the energy take-up $i_{nv}$ of the energy consumer NV increases.

The resulting difference between the energy take-up $i_{nv}$ of the energy consumer NV and the energy take-up $i_{ls}$ of the charging device LG is compensated by the energy store B.

If the energy take-up $i_{nv}$ of the energy consumer NV exceeds the energy take-up $i_{ls}$ of the charging device LG, an additional release of energy $i_{se}$ from the energy store B occurs. If the energy take-up $i_{nv}$ of the energy consumer NV undershoots the energy take-up $i_{ls}$ of the charging device LG, an energy take-up $i_{sl}$ of the energy store B occurs.

Figure 6:
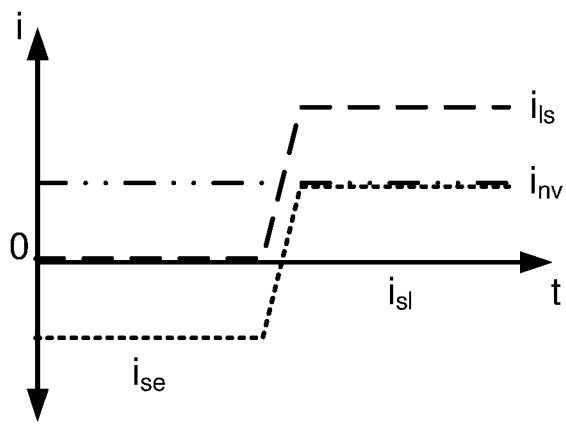

FIG. 6 shows an exemplary embodiment of an energy characteristic according to the invention. The control device SV here is designed to control the energy take-up $i_{ls}$ of the charging device LG and the energy take-up $i_{nv}$ of the energy consumer NV such that, according to a current temperature of the energy store B and a service temperature of the energy store B, a duration of an energy store heat-up phase is determined.

In accordance with a planned departure time and the duration of the energy store heat-up phase, the energy take-up $i_{nv}$ of the energy consumer NV and the energy take-up $i_{ls}$ of the charging device LG are to be controlled such that, at the planned departure time, the energy store B achieves the service temperature.

During the first part of the energy store heat-up phase, the energy take-up $i_n$, of the energy consumer NV here is supplied by a release of energy $i_{se}$ from the energy store B. This results in a reduction in the state of charge of the energy store B.

Immediately prior to the planned departure time, the energy take-up $i_{ls}$ of the charging device LG is increased, with the result that the energy take-up $i_{nv}$ of the energy consumer NV is supplied by the energy take-up $i_{ls}$ of the charging device LG and, additionally, the state of charge of the energy store B is increased by an energy take-up $i_{sl}$ of the energy store B.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for controlling a preconditioning of an energy store incorporated in a motor vehicle, comprising: a control device operatively configured to: control an energy take-up of an energy consumer and an energy take-up of a charging device incorporated in the motor vehicle so that a difference is generated between the energy take-up of the energy consumer and the energy take-up of the charging device, compensate a difference generated by an energy take-up of the energy store or by a release of energy from the energy store, whereby the energy store is warmed by power loss associated with the energy take-up of the energy store or with the release of energy from the energy store, and control the energy take-up of the energy consumer such that, in an event of essentially constant energy take-up of the charging device, the energy take-up of the energy consumer exceeds and undershoots the energy take-up of the charging device in an alternating manner.

2. The control device as claimed in claim 1, wherein the control device is further configured to:
   entirely compensate the difference between the energy take-up of the energy consumer and the energy take-up of the charging device by the energy take-up of the energy store or by the release of energy from the energy store.

3. The control device as claimed in claim 2, wherein the control device is further configured to:
   control the energy take-up of the charging device such that, in an event of essentially constant energy take-up of the energy consumer, the energy take-up of the charging device exceeds and undershoots the energy take-up of the energy consumer in an alternating manner.

4. The control device as claimed in claim 2, wherein the control device is further configured to:
   control the energy take-up of the charging device and the energy take-up of the energy consumer such that:

in an event of increasing energy take-up of the charging device, the energy take-up of the energy consumer reduces, and/or in an event of reducing energy take-up of the charging device, the energy take-up of the energy consumer increases.

5. The control device as claimed in claim 1, wherein the control device is further configured to:

control the energy take-up of the charging device such that, in an event of essentially constant energy take-up of the energy consumer, the energy take-up of the charging device exceeds and undershoots the energy take-up of the energy consumer in an alternating manner.

6. The control device as claimed in claim 1, wherein the energy consumer is a heating device, an air conditioning system or a cooling device of the motor vehicle.

7. The control device as claimed in claim 1, wherein the control device is further configured to:

control the energy take-up of the energy consumer and the energy take-up of the charging device when the motor vehicle is connected to a second charging device which is external to the motor vehicle.

8. A control device for controlling a preconditioning of an energy store incorporated in a motor vehicle, comprising: a control device operatively configured to: control an energy take-up of an energy consumer and an energy take-up of a charging device incorporated in the motor vehicle so that a difference is generated between the energy take-up of the energy consumer and the energy take-up of the charging device, compensate a difference generated by an energy take-up of the energy store or by a release of energy from the energy store, whereby the energy store is warmed by power loss associated with the energy take-up of the energy store or with the release of energy from the energy store, and control the energy take-up of the charging device and the energy take-up of the energy consumer such that: in an event of increasing energy take-up of the charging device, the energy take-up of the energy consumer reduces, and/or in an event of reducing energy take-up of the charging device, the energy take-up of the energy consumer increases.

9. A method for controlling a preconditioning of an energy store incorporated in a motor vehicle, the method comprising the steps of: controlling an energy take-up of an energy consumer and an energy take-up of a charging device incorporated in the motor vehicle such that a difference is generated between the energy take-up of the energy consumer and the energy take-up of the charging device; compensating the difference by an energy take-up of the energy store or by a release of energy from the energy store, whereby the energy store is warmed by power loss associated with the energy take-up or with the release of energy from the energy store, determining a duration of an energy store heat-up phase according to a current temperature of the energy store and a service temperature of the energy store; and controlling the energy take-up of the energy consumer and the energy take-up of the charging device according to a planned departure time and the duration of the energy store heat-up phase such that, at the planned departure time, the energy store achieves the service temperature.

* * * * *